United States Patent [19]

Taylor-Brown et al.

[11] 4,264,672

[45] Apr. 28, 1981

[54] POLYMER FILMS

[75] Inventors: Terence J. Taylor-Brown, Ipswich, England; James Jack, deceased, late of Mistley, England, by Margaret Jack, administratrix

[73] Assignee: Bakelite Xylonite Limited, London, England

[21] Appl. No.: 77,187

[22] Filed: Sep. 20, 1979

Related U.S. Application Data

[63] Continuation of Ser. No. 604,542, Aug. 14, 1975, abandoned.

[30] Foreign Application Priority Data

Aug. 14, 1974 [GB] United Kingdom ............... 42460/74
Sep. 30, 1974 [GB] United Kingdom ............... 35781/74

[51] Int. Cl.$^3$ .......................... B32B 5/16; B32B 5/18; B32B 27/00

[52] U.S. Cl. ...................... 428/310; 264/53; 264/54; 264/321; 428/311; 428/323; 423/332; 428/500

[58] Field of Search ...................... 264/321, 54, 53, 51, 264/DIG. 13; 428/220, 500, 332, 310, 311, 323

[56] References Cited

U.S. PATENT DOCUMENTS 3,422,172  1/1969  Dekker ............................. 264/321 X Primary Examiner—Thomas J. Herbert, Jr.
Attorney, Agent, or Firm—Haight, Rosfeld, Noble & Santa Maria

[57] ABSTRACT

A stretched polyolefin film, suitable for use as a packaging material, comprising a uniform cellular structure produced by the use of a blowing agent and consisting essentially of a crystalline having a broad molecular weight distribution and a low Melt Flow Index wherein the film contains 0–25% by weight of fillers or pigments and wherein the film has a thickness of 11 mils or less.

8 Claims, No Drawings

POLYMER FILMS

This is a continuation of application Ser. No. 604,542 filed on Aug. 14, 1975, now abandoned.

The present invention provides a cellular film produced from a crystalline linear polyolefin and particularly but not exclusively a cellular film produced from a high density ethylene polymer.

It is known to produce plastic films including polyolefin films using the extrusion method in which the film is either extruded as a cylindrical tube through an annular die or as a flat sheet through, for example, what is known in the art as a fishtail die. In the former method, the cylindrical plastic tube leaves the annular die in a semi-molten condition and is prevented from collapsing by means of a gas pressure within the tube. If the gas pressure is increased to inflate the tube to stretch the tube and reduce its wall thickness, the process is commonly called the blown-film process.

It is also known to produce cellular polymer articles including extruded articles from thermoplastics materials including polyolefins by the incorporation, in the polymer, of a blowing agent, such as a gas or vaporizable liquid (these being commonly referred to as physical blowing agents) or a decomposable solid (commonly referred to as a chemical blowing agent) under conditions which prevent substantial cell formation within the polymer and then altering the conditions during or after extrusion such that cell formation and expansion of the polymer occur.

According to the present invention, there is provided a novel stretched polyolefin film having a substantially uniform cellular structure and comprising a crystalline linear polyolefin which film has the following characteristics:

(1) it comprises no more than 14% by volume of the film of closed cells determined as hereinafter described;

(2) it has an apparent density as hereinafter defined which is 90 to 20%, advantageously 90 to 40% and preferably 80 to 55% of the density of the starting polyolefin composition;

(3) it has a cell factor, as hereinafter defined, equal to or less than +0.65 and which factor may be zero or negative;

(4) it contains from 0 to 25% by weight based on the polyolefin of a filler and/or pigment;

(5) it has a thickness of up to 11 mils, preferably no greater than 7 mils;

(6) it comprises cells with dimensions such that the average cell volume determined as hereinafter described is no greater than $10^{-4}$ cc and is advantageously no greater than $10^{-5}$ cc and is at least $10^{-7}$ cc; and (7) it has been stretched in the plane of the film by an amount corresponding to a stretch ratio within the range 1.1:1 to 10:1 in at least one of, preferably each of, the machine and transverse directions, preferably at a temperature at or above the crystalline melting point of the polyfin.

Preferably the film of the invention also has one or more of the following further characteristics:

(a) it contains a number of cells, determined as hereinafter described, of at least 50000/cc of film; preferably at least 200000/cc of film.

(b) it contains residues of a chemical blowing agent, preferably those of azodicarbonamide;

(c) it has a water vapour permeability of less than 500 gm/m$^2$. 24 hrs measured according to BS 3177, preferably employing the tropical conditions specified therein;

(d) it has an air permeability of less than 500 ml/m$^2$. sec preferably less than 450 ml/m$^2$. sec as determined by the method described herein; and (e) the majority of cells which are open, preferably substantially all of the open cells, do not communicate with both major surfaces of the film.

Preferably the crystalline polyolefin is a high density ethylene polymer, which desirably has a broad molecular weight distribution and advantageously a low Melt Flow Index as measured according to BSS 2782.

The invention also provides a process for the production of a cellular polyolefin film which process comprises feeding a polyolefin composition comprising a linear polyolefin, which is at least partially crystalline at room temperature, and a blowing agent through an extruder and die associated therewith to produce a cellular extrudate and stretching said cellular extrudate by an amount corresponding to a ratio of at least 1.1:1 in at least one of the machine and transverse directions, the extrusion temperature and the blowing agent system being so chosen that when the extrudate is stretched, a film having the quoted parameters is obtained.

In the process of the present invention the blowing agent is preferably a chemical blowing agent, preferably azodicarbonamide, if necessary together with an accelerator or a retarder.

In the process of the present invention, when the blowing agent is a chemical blowing agent, preferably only partial decomposition of the blowing agent occurs before the point at which cells begin to form.

In this specification the term "substantially uniform cellular structure" is intended to mean a cellular structure in which the cell distribution and the relative proportions of open to closed cells is substantially uniform throughout the area of the film.

The cell factor of the films of this invention is defined as $$F = (T - 2.0)/Z$$

where
F is the cell factor,
T is the thickness of the film in mils, and
Z is the percentages by volume of the film of closed cells, determined as herein described.

Preferably, in the films of the invention, the minimum size of the cells is $5 \times 10^{-7}$ cc.

Manufacturers of articles especially for the packaging industry, and in particular bags from prior films produced from polyolefin materials, have been in a somewhat unfavourable position compared with the manufacturers of the competitive paper counterparts. Polyolefin film bags have been considerably over-engineered in terms of the requirements of the market, the average bag being appreciably more durable than the conventional paper bag which it would replace. Also, the economics of polyolefin film bag production has been considerably affected by rises in price of the basic polymer.

Polyolefin film materials of this invention and particularly but not exclusively the film materials based on high density ethylene polymers have especial ulility within the packaging field. Films having a thickness of no greater than 2.5 mils, for example 1 mil, are suitable for general packaging applications including bags and wrappings. Such films are normally substantially transparent when unpigmented and when based on high density ethylene polymers may have a dry paper-like feel. Materials having a thickness within the range 2.5-6 mil and above are suitable, for example, for the high fashion carrier bag market. Films having a thickness within this range are normally at least substantially translucent even when unpigmented. Further, films having a thickness in the region of 1 to 3 mils, for example, which are heat shrinkable may find valuable application in the shrink packaging field. It has moreover been found that a film which is especially suitable for food wrapping purposes and for other applications in which an enhanced gas permeability is required can be produced by perforating a polyolefin film of the invention by an electrical discharge method and this invention provides such a perforated film. Such films which are permeable to liquids can be used in filtering operations. The cellular film of the invention may be produced by a method which comprises expanding a polyolefin composition by blending the composition which comprises a linear polyolefin, which is at least partially crystalline at room temperature, and a blowing agent, preferably of the chemical type as hereinbefore defined which evolves a gas such as $CO_2$, CO or $N_2$ by decomposition, in a screw extruder in which the composition is heated to activate the blowing agent before extruding the composition from an extrusion die fitted to said extruder, and stretching the extrudate thus produced. Evolution of gas normally commences in the extruder but in the preferred process, it is arranged that a high pressure is maintained within the extruder until just before extrusion occurs such that complete expansion is prevented from taking place before the polymer composition emerges from the die. It is believed that, in order to produce a uniform product, it is important that, when employing a chemical blowing agent, only partial decomposition of the blowing agent occurs before the point at which cells begin to form, this point preferably being outside the die or not more than a short distance within the die. It is also believed to be important to have efficient cooling of the extrudate after it leaves the die to control the effect of gas or vapour pressure on cell dimensions, preferably while still permitting the cellular extrudate to be stretched above the crystalline melting point of the polyolefin. When, as is preferred, the blown-film process is employed to produce the cellular film of this invention, a conventional air-cooling ring may be employed, the most suitable position of which and rate of cooling derived from which can be found by experiment.

The choice of a particular blowing agent system in the process of the invention will depend on tailoring a blowing agent for example by combining it with an accelerator or a retarder, or by adjusting its amount within the composition so that the desired degree of foaming occurs at the desired time, when the polyolefin composition is being extruded under optimum temperature conditions. Whether a given blowing agent system is suitable for use in the process can easily be determined by determining the decomposition characteristics of a blowing agent system and matching them to the extrusion conditions desired. The cellular film of the invention is considerably more economic than conventional film materials by virtue of a reduction in density resulting from the presence of a large number of cells, normally at least about 50,000 cells/cc determined as hereinafter described, which may interconnect to a large extent, but without such a sacrifice of desirable physical properties in comparison with the properties of non-cellular films, that the novel material of the invention is rendered non-competitive therewith. A film of this invention may be part of a larger structure, for example a laminate comprising in addition to said film a layer of another material such as polymer film or sheet, paper or other natural or synthetic fibrous structure, or the like.

It is considered advantageous in the process of the present invention if the temperature at which the polyolefin composition is extruded is kept as low as possible but consistent with the production of a cellular extrudate substantially free from surface blemishes and irregularities arising from non-uniform extrusion from the die and which sometimes gives the surface of the extrudate an appearance of sharkskin, for example.

It is an essential feature of the process of the present invention that there should be a stretching stage. The temperature of stretching is advantageously at or above the crystalline melting point of the polyolefin and the ratios of stretching in at least one of, preferably each of, the machine and transverse directions should be at least 1.1:1 and may be as high as, for example, 10:1. When the polyolefin is a high density ethylene polymer, the ratios are preferably each in the range 2:1 to 6:1 when the cellular film is for normal wrapping and bag applications; however, when the cellular film is to be used in shrink wrap applications, the stretch ratios are advantageously such that in the plane of the film the shrinkage at 130° C. is from 50% to 75% in the machine direction and from 0% to 35% in the transverse direction.

The cellular film of the invention may be produced from any polyolefin composition comprising a film-forming linear polyolefin, which is at least partially crystalline at room temperature, and a blowing agent, which can be extruded to form a cellular film or cellular film precursor such as a cellular sheet or tube. Especially desirable properties are inherent in cellular films prepared from compositions in which the crystalline linear polyolefin material is selected from polyethylene, polypropylene and copolymers of ethylene and of propylene and particularly when the polyolefin material is a high density ethylene polymer having a density of at least 0.94 gm/cc. Blends of polyolefins may however, also be used wherein a crystalline linear polyolefin is a major component: for example a blend of high density polyethylene with a minor amount of low density polyethylene. The preferred high density ethylene polymers may be prepared by polymerising ethylene, and if desired, a minor amount e.g. 0.5-10% by weight of an alpha-olefin copolymerisable therewith, such as propylene or butene-1, by for example the conventional low pressure methods as practised in the art for many years. High-density ethylene polymers include, for example, the materials commercially available under the trade marks "Rigidex" 2000, "Hizex" 7000F, "Hostalen" GMVP 9955F, "Unifos" DMDJ 3472 and the like.

Preferred high-density ethylene polymers for the production of extruded cellular films of this invention are polymers having a broad molecular weight distribution and preferably also a low Melt Flow Index (MFI) as measured according to BS 2782. "Hizex" 7000F (supplied by Mitsui Petrochemical Industries Ltd.) having a density of 0.952 gm/cc and a MFI of 0.03 g/10 min. is exemplary of such a preferred high-density ethylene polymer.

Some high-density ethylene polymers used for the production of the films of the invention may require the addition of cell control additives and/or blowing agent control additives to assist the formation of the desired uniform structure. Such cell control additives or blowing agent control additives which are of course additional to the blowing agent employed, include for example, nucleating agents, blowing agent retarders, blowing agent accelerators (sometimes known as kickers) or a combination of two or more of such additives. High-density ethylene polymers of narrow molecular weight distribution and/or of MFI in the higher region of 0.1–0.7 g/10 min are exemplary of those in which the incorporation of cell control additives and/or blowing agent control additives can be of particular advantage. Of particular merit, it has been found, is a combination of from 0.05 to 0.75% by weight based on the weight of polyolefin, of a metal salt of a long chain organic acid, especially a partially saponified montanic acid ester, and from 0.05 to 0.75% of either a long chain fatty acid amide, especially a stearamide or oleamide, or of a hydrogenated glyceride of one or more fatty acids, especially a hydrogenated tallow. Such combinations are believed to be combinations of blowing agent accelerator and blowing agent retarder.

The crystalline melting point of a crystalline polyolefin is defined as that temperature above which crystalline regions cannot be recognised, for example, the temperature at which spherulite disappear when a sample of the polyolefin is heated while being examined by means of a polarising microscope. Melting points of commercially available polyolefins are found to be of the order of 135° C., 175° C. and 237° C. for respectively linear polyethylene, polypropylene and poly 4-methyl pentene-1.

Blowing agents which may be included in the polyolefin compositions used to prepare the cellular films of the invention are preferably those which are activated, particularly by decomposing, at temperatures above the melting point of the polyolefin employed and which, when the polyolefin is a high density etylene polymer, is advantageously above 150° C. since for high density ethylene polymers the extruder temperature will normally be in the range 150° C. to 250° C. At the same time, the activating temperature and activation time of the blowing agent should not be such that degradation of the polyolefin occurs to any adverse extent. Although blowing agents which are gases or liquids at room temperature may be employed the preferred blowing agents are those which are solid at room temperature since they are then incorporated easily into the polyoleifn. For economic reasons, it is preferred to use blowing agents which, on decomposition, provide many volumes of gas per unit volume of blowing agent. However, to produce a substantially uniform cellular structure in the film of the invention, very good nucleation of cell formation is highly desirable such that a large number of cells of small size are formed.

Suitable chemical blowing agents, particularly when the polyolefin is a high density ethylene polymer, include those having a decomposition temperature in the range from 190° to 230° C., and which produce nitrogen on decomposition. Especially suitable blowing agents include azodicarbonamides commercially available under the trade designations "Genitron" and "Celogen". The amount of such blowing agent employed in the polyolefin composition is preferably 0.1 to 1.0% by weight based on the weight of polyolefin for the production of the cellular films of the invention, and especially preferred is an amount of 0.1–0.5% by weight based on the weight of polyolefin of "Genitron" AC-2 supplied by Fisons Industrial Chemicals Ltd.

In carrying out the process of the present invention, the blowing agent may be incorporated into the polyolefin by melt blending in an extruder. Physical blowing agents may be for example incorporated by direct injection into the extruder. Chemical blowing agents and any other necessary additives may be mixed with the polyolfein by, for example, tumble blending, for example using liquid paraffin or other adhesion promoter to bind solid additives to the polymer pellets. The blowing agent and any other necessary additives may alternatively be made up into a masterbatch with some of the polyolefin material on, for example, a heated mill, or in an extruder, the blending being continued until an intimate mixture of the components is obtained, whilst retaining the temperature below the activation temperature of the blowing agent. The product, when granulated may then be employed as a masterbatch in the usual way.

Other additives which may optionally be incorporated in the polyolefin compositions include lubricants, antioxidants, organic and/or inorganic fillers, extenders, pigments or other colouring matter, modifiers and opacifiers and the like provided that in the amounts used, they do not interfere with production of a material having a substantially uniform cellular structure. Fillers and/or pigments will normally not be incorporated to a level greater than 25% by weight based on the weight of polyolefin. The additives may include compounds which improve the surface characteristics of the cellular extrudate. It has, for example, been found that for a high density ethylene polymer having a narrow molecular weight distribution and relatively high melt flow index, the addition of a small amount, typically up to 1% by weight based on the weight of polyolefin and preferably from about 0.1% to 0.2% of an aryl sulphonic acid derivative, especially a toluene sulphonyl semicarbazide is of particular merit.

An extrusion line for the production of cellular films according to the present invention may comprise, for example, a thermoplastics extruder for use in producing an extruded tubular cellular product; means for stretching said product, preferably at a temperature at or above the crystalline melting point of the polyolefin and preferably including inflation-stretching means as employed in conventional blown film processes; means for controlling the degree of stretching in both the transverse and machine directions comprising, for example, means to control the inflation pressure within the inflated tubular cellular product and the relative speeds of film entering and leaving the region in which stretching of the cellular product takes place, which relative speed control means may comprise, for example, means for adjusting the extrusion rate and means for adjusting the haul-off speed downstream of said region; and means to convert the stretched tubular cellular product to a flat form, which latter means may comprise conventional collapsing means as employed in blown film processes to reduce the tubular film to a lay-flat form.

It will be appreciated that the cellular films of this invention may be produced directly in flat form by converting the extruded tubular cellular product to a flat form prior to stretching it on a flat-bed stretcher. Alternatively, a flat cellular product may be fed to a flat bed stretcher from a flat-sheet extrusion die. However, to employ inflation-stretching of a tubular cellular product, in the manner employed in a conventional blown film process, is preferred. It is believed to be generally important that, to obtain the cellular films of this invention having a substantially uniform cellular structure, the extruder and extrusion die arrangement should be such that, during extrusion, a rapid pressure drop occurs across the die outlet, thus it is preferred that the extrusion die lips employed have short lands, that is to say, of length 0.125 inch or less.

The cellular films according to the present invention may be subjected to conventional surface treatment processes, for example, to improve bonding and/or the adherence of printing, for example, by corona discharge treatment effected by passing the film over an earthed dielectric covered roller between which and a high tension electrode spaced therefrom, a corona discharge is maintained. The cellular films may also be subjected to conventional mechanical modifying treatments including, for example, embossing and perforation. The cellular films of the invention, treated or modified as desired, may be converted into film articles. The stretched cellular films of the invention may be shrinkable and, therefore, suitable for shrink-wrap applications.

It will be appreciated that an in-line assembly of suitable apparatus may allow for the production of the cellular film, its treatment and conversion to film articles in a continuous process.

The thickness of the cellular film of the invention, wherever referred to in this specification, is a mean micrometer measured thickness of the film before any modification for example, by embossing, determined from a number of measurements.

The apparent density of the cellular film of the invention, is determined by the following method. The thickness of the film as stated above is based on readings made with a micrometer gauge, employing BS 2782 method 512B (1970) but using a gauge capable of being read to 0.001 mm. The test specimen has an area of 50 sq.cm. The specimen is weighed and from its weight and dimensions, the apparent density calculated to give a value in gm/cc.

Because of the substantially open cell nature of some of the films of the invention any method employed for density determination involving the use of Archimedes principle may give a result in excess of the apparent density.

The percentage by volume of open cells in a film of the invention is calculated employing the "ultimate density" determined by an Archimedian method using the "ultimate weight" of the sample as follows:

The ultimate weight of a film sample is the weight of the sample 50 sq cm is area plus a sinker in an aqueous solution (described below) after suspension therein for a period of 23 hrs, less the weight of the sinker alone in the same aqueous solution. For floating samples this will give a negative figure. The aqueous solution employed is made up using distilled water which has been freshly boiled and allowed to cool, and a sufficient amount of a wetting agent, suitably 1 drop per 50 ml. of water of, for example, "Teepol" (Registered Trade Mark of Shell Chemicals Ltd.). The ultimate density is calculated from the ultimate weight, and the weight of the dry film sample in air measured prior to suspension in the aqueous solution, according to the formula:

$$D\ ult = \frac{\text{weight of dry film sample in air (gm)}}{\text{weight of dry film sample in air-ultimate weight of film sample (gm)}}\ gm/cc$$

This ultimate density may be used to determine the percentage volume of open cells and indirectly to determine the percentage volume of closed cells in the film samples. The greater the volume of open cells communicating directly or indirectly with a surface, in relation to the volume of closed cells, the nearer the ultimate density approaches the density of the basic polyolefin composition.

Percentage open cells (by volume) "$X$" =
$$\frac{(D\ ult - D\ app)}{D\ ult} \times 100\%$$

Percentage total cellular volume "$Y$" =
$$\frac{(D\ max - D\ app)}{D\ max} \times 100\%$$

Where D max is density in gm/cc of polyolefin composition including polyolefin and all additives
D ult is ultimate density in gm/cc of cellular film
D app is apparent density in gm/cc of cellular film
Clearly, percentage closed cells (by volume) "$Z$"="$Y$"—"$X$"

The average cell volume of the cellular materials of this invention is equal to the quotient $$\frac{\text{Total volume of cells in cc per cc of film}}{\text{Number of cells per cc of film}}$$

where the total volume of cells per cc of film $$= \frac{D\ max - D\ app}{D\ max}\ cc$$

The number of cells per cc of film may be determined by any suitable means provided that the volume of film is derived taking the thickness of the film as that referred to herein. Methods employing microscopy are preferred. For example, for thin transparent or translucent films, the number of cells per square centimeter of film may be counted with the aid of a travelling microscope. On determining the thickness of the film in the manner described above, the number of cells per cc of film may be computed. For thicker films, a value can be computed from a similar count carried out on a known weight of a thinner film derived therefrom by stretching it. Alternatively, thicker materials may be examined by counting the numbers $n_1$, $n_2$, $n_3$ of cells per unit area exposed on each face produced by making cuts along three planes perpendicular to one another from which $\sqrt{n_1 \times n_2 \times n_3}$ gives an average number of cells per unit volume. Other methods will be evident to the skilled microscopist. It should be appreciated that both open and closed cells (when present) are counted so that the value of the average cell volume for such materials will be empirical only but serves for the purpose of characterising the materials of this invention.

Preferably, the water vapour transmission rate (water vapour permeability) of the cellular film of the present invention should be less than 500 gm/m$^2$. 24 hrs measured according to BS 3177 employing a temperature of 25° C. and relative humidity of 75% and most preferably below this value also when employing a temperature of 38° C. and relative humidity of 90%. Preferably the air permeability of the cellular film of the present invention is less than 500 ml/m². sec, and preferably less than 450 ml/m². sec determined by the method described below.

The air permeability is determined by a method which comprises measuring the steady rate of flow of air which has permeated a film sample having a surface area of 8.8 sq. cm. The film sample is clamped between two chambers having a pressure difference of 0.1 bar maintained therebetween; the down-stream chamber being conveniently at atmospheric pressure. A fine gauze (30 mesh/linear cm of 5 mil dia. wire) supported by a coarse gauze (8 mesh/linear cm of 23 mil dia wire) is so arranged that it supports the film sample in a flat, undistorted condition under the applied air pressure whilst not significantly impeding the air flow. The steady air flow is measured as it passes to atmosphere from the downstream chamber making allowance for pressure losses across the measuring means. The apparatus is maintained uniformly at a constant temperature of 23° C. to avoid errors caused by changes in the air volume in the down-stream chamber. Observations are made of the steady air flow rate and the result calculated as milliliters of air per square meter of sample per second for the pressure difference of 0.1 bar.

It is believed that in some cases low permeabilities may arise from the cells of the cellular structure substantially retaining their individual identity so that, although cells may be interconnecting, the communicating channels are of small dimensions and are tortuous in nature. It is further believed that, in some cases, in apparently open cell structures the majority of the cells which are open do not individually communicate with both major surfaces of the film.

The following examples are given to illustrate the present invention but to in no way limit the scope thereof:

EXAMPLE 1

An extruder fitted with a 2" diameter extrusion screw with an L/D ratio of 25/1 and such as to give a compression ratio of 3.5/1 was used to produce a 25 micron thick cellular film, having a substance weight of 16.4 gm/m² and thus an apparent density of 0.655 gm/cc.

The polyolefin composition used to produce the above film was based on "Hijex 7000F", a crystalline linear high density polyethylene of density 0.952 gm/cc an MFI of 0.03 gm/10 min (measured according to BS 2782) and having a broad molecular weight distribution, the composition having the following formulation:

| | Parts by weight |
|---|---|
| "Hizex 7000F" (supplied by Mitsui Petrochemical Industries Ltd) | 100 |
| Liquid Paraffin | 0.1 |
| "Genitron AC-2" (supplied by Fisens Industrial Chemicals Ltd.) | 0.15 |

The polyethylene granules were tumble-mixed with the liquid paraffin to coat the granules uniformly. The coated granules were then tumble-mixed with the blowing agent powder to obtain granules with the blowing agent distributed uniformly thereon.

The die gap was fixed at 0.015 in. in a side-fed, single start 1.5 in. diameter spiral mandrel annular die fitted to the extruder. Other details of the extruder, die and extrusion conditions were as follows:

Die land length—0.125 in.
Filter pack (mesh size)—20/80/100/80/20
Screw Speed—22 rpm
Pressure of melt entering die—5200 psi
Output—20 lb/hr
Temperature of melt entering die—200° C.
Mandrel Tip temperature—202° C.

Temperature profile in Extruder for zones between feed end and die were:

| Zone | 1 | 2 | 3 | 4 | 5 | Cooled Zone | 6 | 7 | Die |
|---|---|---|---|---|---|---|---|---|---|
| °C. | 153 | 168 | 176 | 184 | 190 | 193 | 200 | 200 | 205 |

The tubular extrudate issuing upwardly from the die was passed through an air cooling ring situated immediately above the die and then through a tube collapsing frame to a pair of driven nipped rollers and then reeled up in the cool state. Via a passage through the die, the tube between the die and the nip was inflated with air to give a blow-up ratio of 3/1. By adjustment of the speed of the nipped rollers, the longitudinal stretch ratio was adjusted to be 7/1. The air cooling ring was adjusted such that the frost line of the bubble occurred 5 inches above the die orifice.

The apparent density of this film (0.655 gm/cc) is equivalent to a density reduction of $$\frac{0.952 - 0.655}{0.952} \times 100\%$$
$$= 31.2\%$$

The water permeability of this cellular film was found to be 39.2 gm/m². 24 hr and 11.7 gm/m². 24 hr using the test described in BS 3177 under the tropical and temperate conditions specified therein respectively. The air permeability of the cellular film was 7 ml/m² sec. using the method described herein.

The ultimate density ($D_{ult}$) of the cellular film was found to be 0.923 mg/cc.

The percentage of open cells by volume $(X) = \frac{D_{ult} - D_{app}}{D_{ult}} \times 100\%$ $$= \frac{0.923 - 0.655}{0.923} \times 100\%$$
$$= 29.1\%$$

The density reduction (%) = the percentage cellular volume (Y) = 31.2%.

| The percentage of closed cells by volume (Z) | = Y − X |
|---|---|
| | = (31.2 − 29.1)% |
| | = 2.1% |

The cell factor $F = (T - 2.0/Z)$, where T is the film thickness in mils and Z is as above $$\text{Thus } F = \frac{0.985 - 2.0}{2.1}$$
$$= 0.48$$

Microscopic examination of the substantially transparent cellular material showed it to have an average of 1129 cells per sq cm and thus an average cell volume of $7.0 \times 10^{-7}$ cc.

The following table gives a comparison of other physical properties of the film produced according to this Example with those of a non-cellular film produced from the high density ethylene polymer alone under similar extrusion and stretching conditions;

| Test and Units | Non-cellular film MD | Non-cellular film TD | Example 1 Cellular film MD | Example 1 Cellular film TD |
|---|---|---|---|---|
| Breaking Strength p.s.i. | 9060 | 5600 | 3762 | 3573 |
| Elongation at Break % | 517 | 902 | 81 | 98 |
| 0.2% Secant Modulus p.s.i. $\times 10^4$ | 11.9 | 9.2 | 6.2 | — |
| *Drop Weight Impact Strength - ft.lb | 0.10 | | 0.03 | |
| **Reversion % at 150° C. | 92 | 37 | 83 | 32 |
| Thickness microns | 25 | | 25 | |

*The drop-weight impact strength was determined by clamping the film over an aperture 2 inches in diameter in the manner described in BS 2782 method 306B, and allowing a loaded hemispherical striker of diameter 1 inch and mass 2 ounces, to fall and strike the film centrally. The height of fall was varied to find the energy at which on average 50% of specimens fractured.
**The reversion was measured after immersion in glycerine at 150° C. for 5 minutes.

EXAMPLE 2

In this example, Unifos DMDJ 3472 (supplied by Unifos Kemi A.B.) a high molecular weight crystalline linear polyethylene of density 0.958 gm/cc, having an MFI of 0.2 gm/10 min (BS 2782) and a relatively narrow molecular weight distribution, was employed in the following formulations:

| | parts by weight |
|---|---|
| DMDJ 3472 | 100 |
| Liquid paraffin | 0.1 |
| Genitron AC-2 | 0.25 |
| Wax OP | 0.5 |
| Armid HT | 0.5 |

Wherein Wax Op is a partially saponified ester of montanic acid (available from Farbwerke Hoechst A.G.) and Armed HT is hydrogenated tallow (available from Amorur Hess Corporation).

A 41 micron cellular film of apparent density 0.559 gm/cc was produced using this formulation and the procedure and extruder of Example 1 but with the following extrusion conditions:
Die Gap—0.025 in
Die Land Length—0.125 in
Filter pack (mesh size)—20/80/100/80/20
Screw Speed—17 rpm
Pressure of melt entering die—2800 psi
Temperature of melt entering die—219° C.
Mandrel Tip temperature—225° C.
Height of frost line from die—5 inches
Blow-up ratio—3.47/1
Longitudinal Stretch ratio—3.7/1
The apparent density of this film (0.559 gm/cc) is equivalent to a density reduction of $$\frac{0.958 - 0.559}{0.958} \times 100\%$$
$$= 41.5\%$$

The ultimate density (D ult) of the cellular film was 0.943 gm/cc using the method described hereinbelow.
The percentage of open cells by volume (X)

$$= \frac{D\ ult - D\ app}{D\ ult} \times 100\%$$

$$= \frac{0.943 - 0.559}{0.943} \times 100\%$$

$$= 40.7\%$$

The percentage of closed cells by volume $(Z) = (41.5 - 40.7)\% = 0.8\%$

The cell factor $(F) = \frac{T\ (in\ mils) - 2.0}{Z}$

Thus $F = \frac{1.62 - 2.0}{0.8}$ $= -0.48$

The water vapor permeability of this cellular film was found to be 140 gm/m².24 hr using the test described in BS 3177 under the tropical conditions specified therein.

The air permeability of the cellular film was 36 ml/m².sec by the method described herein.

Microscopic examination of the substantially transparent cellular material showed it to have an average of 554 cells per sq cm enabling an average cell volume of $3.1 \times 10^{-6}$ cc to be calculated.

EXAMPLE 3

The extruder used in this example was fitted with a two stage screw having a nominal L/D ratio of 25/1 and an overall length of 152 cm. The screw, which had a compression ratio of 2.8/1, was fitted with a mixing head such as described in Union Carbide Corporation British Specification No. 1 226 374, situated prior to the final metering section of the screw, and was bored for water cooling.

The die used was a 10 cm diameter three-start bottom-fed spiral mandrel die and the annular die gap was fixed at 0.015 in.

Other details of the extruder, die and extrusion conditions were as follows:
Die land length—0.125 in
Screw speed—32.5 rpm
Melt pressure (upstream of breaker plate)—2800 psi
Melt temperature—195° C.
Line speed—60 ft/minute
Output rate—14 Kgm/hr
The temperature profile in the extruder for zones between the feed end and the die were:

| Zone | 1 | 2 | 3 | Cooled Zone | 5 | 6 | 7 | 8 |
|---|---|---|---|---|---|---|---|---|
| °C. | 170 | 180 | 185 | 190 | 190 | 190 | 190 | 190 |

The extruded tube was cooled and reeled up in a manner similar to that described in Example 1 to give a lay flat tube of 50 cm width. Via a passage through the die, the tube between the die and the nipped rollers was inflated with air to give a blow-up ratio of 3.4/1. By adjustment of the speed of the nipped rollers, the longitudinal stretch ratio was adjusted to 9/1.

A 22.5 micron thick cellular film was produced having an apparent density of 0.565 gm/cc from the same high density ethylene polymer based composition used in Example 1.

The apparent density of 0.565 gm/cc is equivalent to a density reduction of $$\frac{0.952 - 0.565}{0.952} \times 100\%$$
= 40.7%
= the percentage total cellular volume The film had an ultimate density (D ult) of 0.922 gm/cc. The volume percentage of open cells (X)

$$= \frac{D\ ult - D\ app}{D\ ult} \times 100\%$$
$$= \frac{0.922 - 0.565}{0.922} \times 100\%$$

Thus X=38.7% and the volume percentage of closed cells

= (40.7 − 38.7) %
= 2.0%

The cell factor (F)

$$= \frac{T(\text{in mils}) - 2.0}{Z}$$
$$= \frac{0.835 - 2.0}{2.0}$$
= −0.58

The water vapour permeability of this cellular film was found to be 42 gm/m².24 hr using the test method employed in Example 2.

The air permeability of the film was 2.3 ml/m².sec by the method described herein.

From a microscopic examination of the substantially transparent cellular film the cell content was found to be 250 cells per sq. cm. of film consistent with an average cell volume of $3.9 \times 10^{-6}$ cc.

EXAMPLE 4

Extrusion of the formulation of Example 3 was repeated using the same extruder and extrusion conditions employed therein whilst drawing the film off at a longitudinal stetch ratio of 1.2/1 and inflating with air to give a blow-up ratio of 5/1.

A cellular lay-flat film produced therefrom in the manner described in Example 1 had a thickness of 120 micron.

This film had an apparent density of 0.636 gm/cc which is equivalent to a density reduction of $$\frac{0.952 - 0.636}{0.952} \times 100\%$$
= 33.2%
= the percentage total cellular volume The film had an ultimate density (D ult) of 0.857 gm/cc. The volume percentage of open cells (X)

$$= \frac{D\ ult - D\ app}{D\ ult} \times 100\%$$
$$= \frac{0.857 - 0.636}{0.857} \times 100\%$$

Thus X=25.8% and the volume percentage of closed cells Z

= (33.2 − 25.8) %
= 7.4%

The cell factor (F)

$$= \frac{T(\text{in mils}) - 2.0}{Z}$$
$$= \frac{4.73 - 2.0}{7.4}$$
= 0.37

The water vapour permeability of the film was found to be 30 gm/m².24 hr using the test method employed in Example 2.

The air permeability of the film was 7.1 ml/m²sec. by a method described herein.

From a microscopic examination of a substantially transparent 25 micron film produced by further stretching the material produced according to the procedure of this Example, an average number of cells per unit mass was determined, and assuming this to be equivalent to the number of cells per unit mass in the material of the Example, an average cell volume was calculated for the latter to be $3.5 \times 10^{-6}$ cc.

EXAMPLE 5

The extruder and die, the extrusion conditions and the polymer composition extruded were as employed in Example 3. A 42.2 micron thick cellular film was produced as a lay-flat film of width 0.49 meters using the collapsing means described in Example 1, but at a rate of 12 meters/minute.

The film had an apparent density of 0.598 gm/cc which is equivalent to a density reduction of $$\frac{0.952 - 0.598}{0.952} \times 100\%$$
= 37.2%
= the percentage total cellular volume The film had an ultimate density (D ult) of 0.919 gm/cc. The volume percentage of open cells (X)

$$= \frac{D\ ult - D\ app}{D\ ult} \times 100\%$$
$$= \frac{0.919 - 0.598}{0.919} \times 100\%$$

Thus X=34.9%
and the volume percentage of closed cells

= (37.2 − 34.9) %
= 2.3%

The cell factor (F)

$$= \frac{T(\text{in mil}) - 2.0}{Z}$$
$$= \frac{1.66 - 2.0}{2.3}$$
= −0.15

The water vapour permeability of the film was found to be 130 gm/m².24 hr using the test method employed in Example 2.

The air permeability of the film was 5.7 ml/m².sec by the method described herein.

The average cell volume of the material was found to be $2.3 \times 10^{-6}$ cc. The shrinkage observed when a 2 inch dia. disc of the film was heated to a temperature of 130° C. for 1 min on an aluminum block lubricated with silicone oil and covered with a 3 mil thick aluminium foil likewise lubricated with silicone oil were:

| Machine Direction | Transverse Direction |
|---|---|
| 70% | 24% |

EXAMPLE 6

The extruder described in Example 1 was employed to produce a 25 micron thick cellular film having an apparent density of 0.559 gm/cc in the following way.

The polyolefin composition employed was based on Hostalen GMVP 9955F high density ethylene polymer having a relatively narrow molecular weight distribution, a density of 0.954 gm/cc and a melt flow index of 0.6 gm/10 mins. measured according to DIN 53735 employing a temperature of 190° C. and 5 Kgm pressure. The polyolefin composition had the following formulation:

| | Parts by weight |
|---|---|
| Hostalen CMVP 9955F (supplied by Farbwerke Hoechst A. G.) | 100 |
| Liquid Paraffin | 0.1 |
| Celogen EA (supplied by Uniroyal Inc.) | 0.1 |
| Genitron AC - 2 | 0.1 |

The Celogen RA is p-toluene sulphonyl semicarbazide.

The polyethylene granules were tumble mixed with the liquid paraffin and then with the other additives in the manner of Example 1.

The die gap was fixed at 0.020 in. in a side-fed single start 1.5 in diameter spiral mandrel annular die fitted to the extruder. Other details of the extrusion conditions were as follows:

Die land length—0.125 in
Filter pack (mesh size)—20/80/100/80/20
Screw speed—19 rpm
Pressure of melt entering die—4400 p.s.i.
Temperature of melt entering die—200° C.

The temperature profile in the extruder for zones between the feed end and die water:

| Zone | 1 | 2 | 3 | 4 | 5 | Un-heated Zone | 6 | 7 | Die |
|---|---|---|---|---|---|---|---|---|---|
| °C. | 153 | 169 | 176 | 189 | 192 | | 199 | 196 | 200 | 200 |

The mode of extrusion and inflation of the extruded tube were as described in Example 1 except that the blow ratio was 3.6:1. The longitudinal stretch ratio was adjusted to be 5.36:1.

The air cooling ring was adjusted such that the frost line of the bubble occurred 5 inches above the die orifice.

The cellular film produced which was substantially free from surface blemishes had an apparent density of 0.559 gm/cc, equivalent to a density reduction of:

$$\frac{0.954 - 0.559}{0.954} \times 100\%$$
$$= 41.4\%$$

The ultimate density (D ult) of the film was found to be 0.938 gm/cc

The percentage open cells by volume (X)

$$= \frac{0.938 - 0.559}{0.938} \times 100\%$$
$$= 40.4\%$$

The volume percentage of closed cells = 1.0% The cell factor for the film had a negative value.

The water vapour permeability of the film was found to be 100 gm/m².24 hr using the test method employed in Example 2. The air permeability of the film was 18.2 ml/m²sec. by the method described herein.

Microscopic examination of the substantially transparent cellular film material revealed it to have an average of 284 cells per sq cm and thus an average cell volume of $3.6 \times 10^{-6}$ cc.

We claim:
1. A stretched polyolefin film suitable for use as a packaging material, having a substantially uniform cellular structure produced with the use of a blowing agent and consisting essentially of a crystalline linear high density polyethylene having a broad molecular weight distribution and a low Melt Flow Index, which film has the following limitations:
   (a) it comprises no more than 14 percent by volume of the film of closed cells;
   (b) it has an apparent density which is 90 to 20 percent of the density of the starting polyethylene composition:
   (c) it has a cell factor equal to or less than +0.65, which factor may be zero or negative, determined according to the formula

$$F = T - 2.0/Z$$

wherein
   F is the cell factor,
   T is the thickness of the film in mils and
   Z is the percentage by volume of the film of closed cells, determined according to ultimate density calculations;
   (d) it contains 0 to 25 percent by weight based on the polyethylene of at least one additive selected from the group consisting of fillers and pigments;
   (e) it has a thickness of up to 11 mils;
   (f) it comprises cells with dimensions such that the average cell volume is not greater than $10^{-4}$ cc;
   (g) it has been stretched in the plane of the film by an amount corresponding to a stretch ratio of at least 1.1 to 1 in the machine in direction or the transverse direction or both;
   (h) it contains at least 50,000 cells/cc of film;
   (i) it contains residues from the decomposition of about 0.1-1 percent by weight of a chemical blowing agent;
   (j) it has a water vapour permeability of less than 500 gm/m².24 hrs;
   (k) it has an air permeability of les than 500 ml/m².sec; and
   (l) the majority of cells that are open do not communicate with both major surfaces of the film.

2. A film as claimed in claim 1, having an apparent density which is 80 to 55 percent of the density of the starting composition.

3. A film as claimed in claim 1, having a thickness no greater than 7 mils.

4. A film as claimed in claim 1, in which the average cell volume is at least $10^{-7}$ cc and no greater than $10^{-5}$ cc.

5. A film as claimed in claim 1, wherein the average cell volume is at least $5 \times 10^{-7}$ cc.

6. A film as claimed in claim 1, wherein the film has been stretched at a temperature at or above the crystalline melting point of the polyethylene.

7. A film as claimed in claim 1, wherein the air permeability is less than 450 ml/m².sec.

8. A film as claimed in claim 1, wherein the blowing agent residues are those of azodicarbonamide.

* * * * *

UNITED STATES PATENT AND TRADEMARK OFFICE
CERTIFICATE OF CORRECTION

PATENT NO. : 4,264,672
DATED : April 28, 1981
INVENTOR(S) : Terence J. Taylor-Brown & James Jack, deceased It is certified that error appears in the above—identified patent and that said Letters Patent is hereby corrected as shown below:

Claim 1, subparagrapg (g), third line: delete "in" after machine

Claim 1, subparagraph (k), first line: "les" should be ---less---

Signed and Sealed this

Eleventh Day of August 1981

[SEAL]

Attest:

GERALD J. MOSSINGHOFF

*Attesting Officer*  *Commissioner of Patents and Trademark*